C. E. McMANIS.
COUPLING.
APPLICATION FILED NOV. 24, 1917.
1,272,486.
Patented July 16, 1918.
2 SHEETS—SHEET 1.
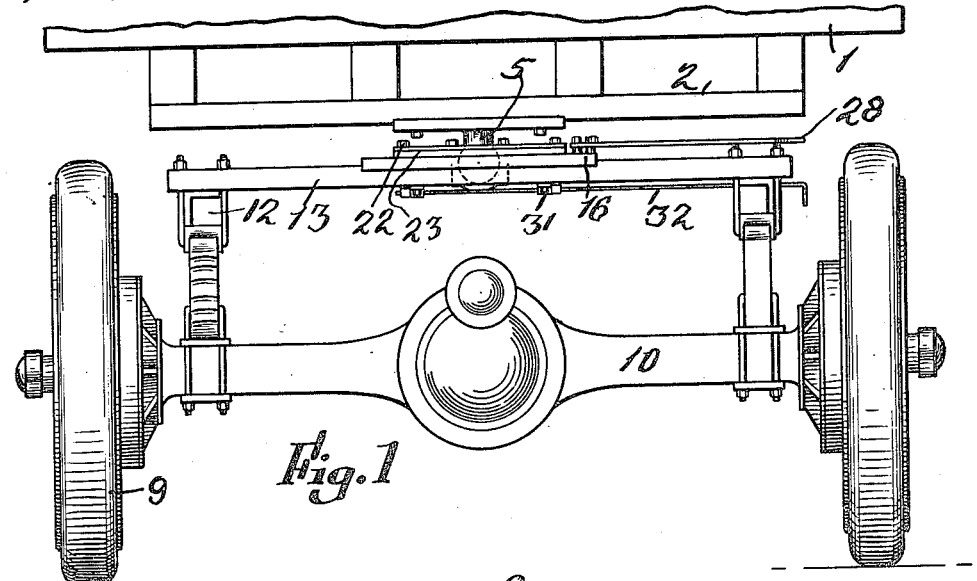
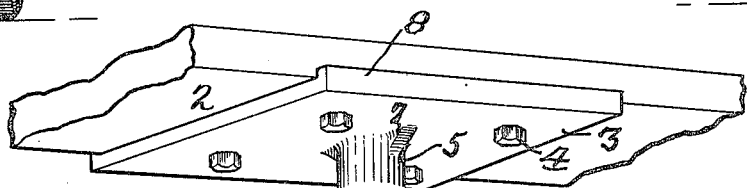
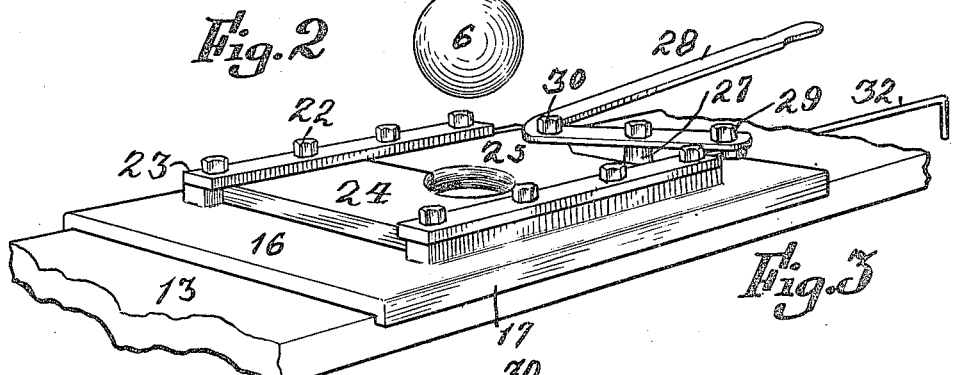
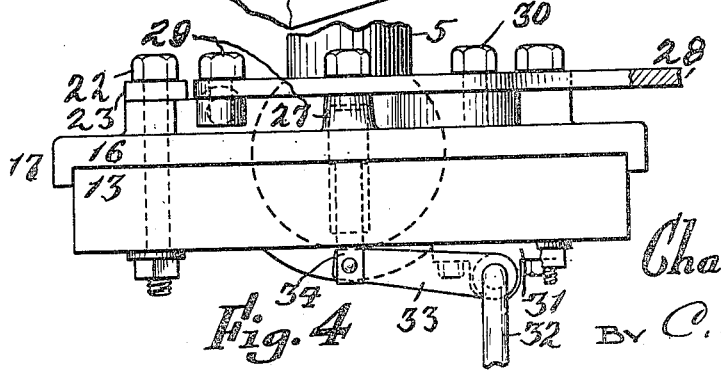
Inventor
Charles E. McManis,
By C. E. Humphrey,
Attorney

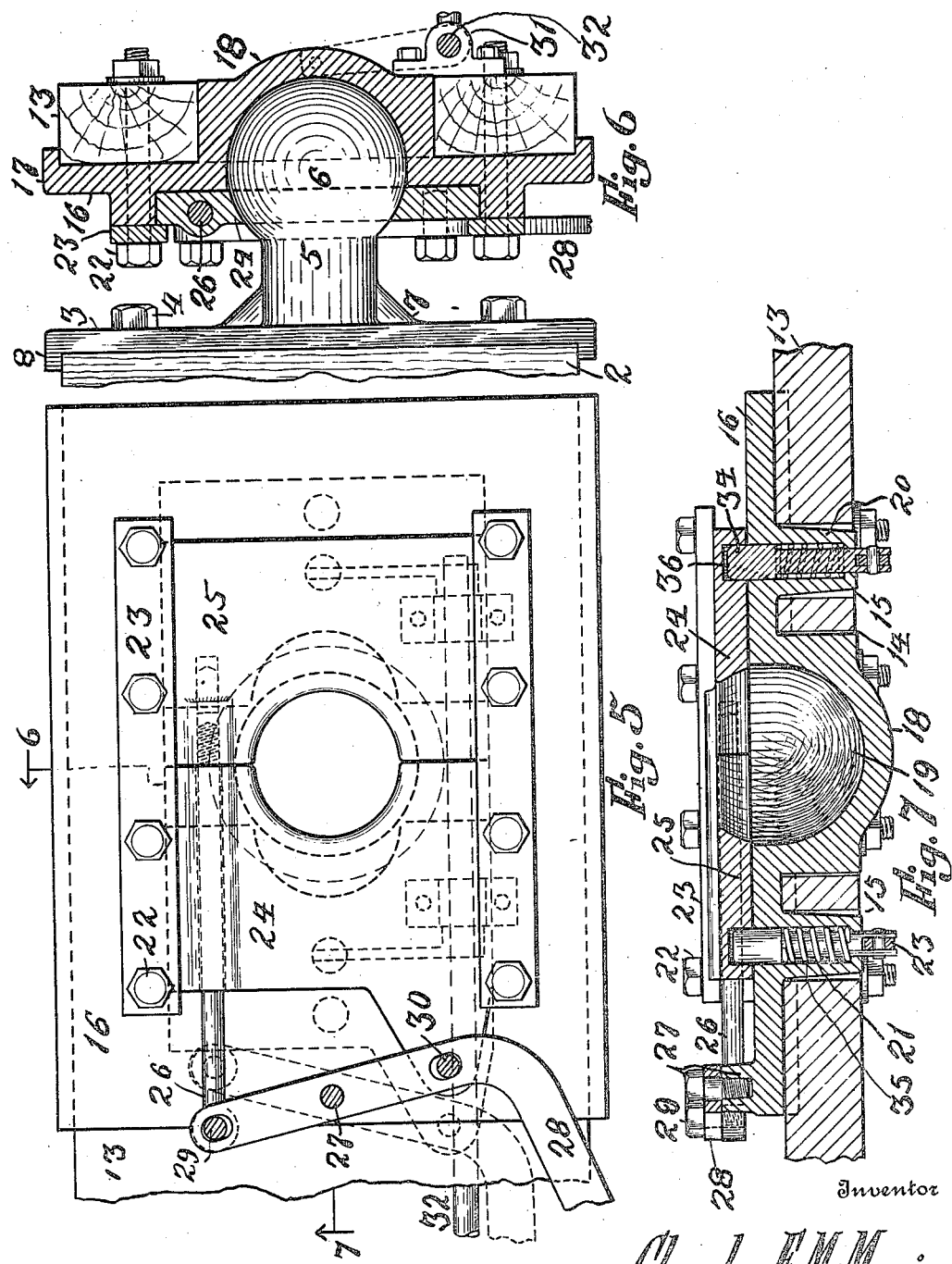

UNITED STATES PATENT OFFICE.

CHARLES E. McMANIS, OF AKRON, OHIO.

COUPLING.

1,272,486.

Specification of Letters Patent.

Patented July 16, 1918.

Application filed November 24, 1917. Serial No. 203,759.

*To all whom it may concern:*

Be it known that I, CHARLES E. McMANIS, a citizen of the United States, residing at Akron, in the county of Summit and State of Ohio, have invented new and useful Improvements in Couplings, of which the following is a specification.

This invention has relation to improvements in coupling devices and has especial relation to means for detachably and pivotally connecting two vehicles such for instance as a tractor and a trailer, in such a manner that the forward end of the trailer is supported at all times and permitted a reasonable amount of movement so as to form a flexible joint between the two vehicles. The invention is primarily designed for use in connection with an automobile which serves as a tractor for coupling it temporarily with a drawn vehicle such as a trailer.

Furthemore, the device is provided with operating means extending outside of the vehicle within easy reach for locking and unlocking the coöperating members together.

With the foregoing and other objects in view, the invention consists in the novel construction and arrangement of parts constituting the invention to be hereinafter specifically described and illustrated in the accompanying drawings which form a part hereof wherein is shown the preferred embodiment of the invention but it is to be understood that changes, variations and modifications can be resorted to which come within the scope of the matter hereinafter claimed.

In the drawings in which reference numerals indicate like parts in the different figures, Figure 1 is an end elevation of the rear portion of so much of an automobile and trailer as will illustrate the connection which this present invention bears to them.

Fig. 2 is a perspective view of the coupling member attached to a trailer.

Fig. 3 is a perspective view of the coupling member attached to the automobile.

Fig. 4 is an end elevation of the two coupling members in their assembled relation.

Fig. 5 is a plan view of the device shown in Fig. 4.

Fig. 6 is a cross sectional view taken on line 6 of Fig. 5 and showing in connection therewith the companion coupling member.

Fig. 7 is a cross sectional view taken approximately on line 7 of Fig. 5.

Referring to the drawings in detail the reference numeral 1 denotes so much of the frame of a trailer as will illustrate the connection of this device with the same. The frame of the trailer embodies a cross bar 2 on the under face of which is secured a base 3 by holding means 4 and projecting centrally and downwardly from the base is a stud 5 terminating in a spherical head or ball 6. The stud 5 may be stiffened or reinforced by webs 7 if desired. The marginal portions of the base 3 are provided with flanges 8 for engaging the side edges of the bar 2 for assisting in holding the coupling member in position.

Below the frame 1 of the trailer in Fig. 1 is shown the rear portion of an automobile provided with the usual ground wheels 9, rear axle 10, and side frame bars 12. Extending between the frame bars is a beam or bar 13 the central portion of which is provided with a recess 14 and on each side of which are smaller recesses 15 for purposes to be later described. Mounted on the central portion of the beam or bar 13 is a plate 16 having marginal flanges 17 which lap the side edges of the beam 13. The central portion of the plate is provided with a downwardly extending socket 18 which is inserted in the recess 14. The interior of this socket is a semispherical recess 19 and of proper size to receive the lower half of the ball shaped head 6. The under face of the plate 16 is furthermore provided with two downwardly-extending integral studs 20 each of which is arranged to be seated in one of the openings or recesses 15 in the beam 13. These studs 20 are provided with openings 21 having contracted lower openings connecting with the larger upper portions by shoulders constituting seats for a purpose to be later described. Secured by holding means 22 to the upper face of the plate 16 are parallel guides 23 and in securing the guides to the plate 16 the bolts or holding members 22 are carried downwardly through the beam 13 and serve to hold the plate 16 in position.

Slidably mounted in the ways 23 are a pair of clamps 24 and 25. These clamps comprise thin plates of sufficient width to be held in position by the ways or guides 23 and are provided with registering semicircular grooves which when the clamps are moved to their operative positions form an opening to embrace the stud 5 above the ball 6 and in order to make the engagement more perfect the edges of these grooves are inclined or beveled so as to approximately fit the upper portions of the ball 6. The plate 25 is provided with a longitudinally-extending opening through which freely slides an operating rod 26 and the member 24 is provided with a boss having a screw threaded opening into which the end of the operating rod 26 engages. Mounted on the upper face of the plate 16 adjacent to the clamping member 25 is a fulcrum 27 on which is mounted an L-shaped lever 28 one end of which is pivotally connected with the end of the operating rod by a bolt 29 and the opposite end with the clamping member 25 by a pivot bolt 30 from which construction it will be seen that as the lever 28 is shifted in one direction it moves the clamps 24 and 25 into the position shown in full lines in Fig. 5 and when shifted in the opposite direction into the position shown in dotted lines in said figure. The lever 28 is arranged to project laterally beyond the side of the automobile so as to be within easy reach of an operator. Mounted on the lower face of the beam 13 are a pair of journals 31 in which is mounted a rod 32 provided with a handle which projects beyond the side of the automobile for ready access. The rod 32 bears two cranks 33 each positioned opposite one of the studs 20 in the lower face of the plate. Mounted in the opening 21 on each of the studs is a locking pin 34 having a reduced portion surrounded by a coiled spring 35 the normal tendency of which is to shift the locking pin upwardly. The free ends of the cranks 33 are each pivotally connected to one of these locking pins. The under face of each of the clamps 24 and 25 are provided with recesses 36 properly disposed so as to receive the pins 34 when the clamps 24 and 25 are shifted to their operative positions as shown in Fig. 7.

In practice the operator releases the pins 34 by manipulating the rod 32 and then shifts the lever 28 to move the clamps 24 and 25 to their operative positions. The trailer is then brought forward and the ball 6 inserted in the recess 19 of the plate 16 and the lever manipulated to shift the clamps 24 and 25 to their operative position causing them to lock the ball 6 loosely in the recess 19. The stud 5 and ball 6 being of heavy construction serve as a ground support for the trailer when disconnected from the automobile and to permit it to be easily raised to its horizontal position.

I claim,

1. A coupling for the purpose described comprising a base secured to one element, a stud on said base said stud terminating in a ball-shaped lower end, a plate on the other element said plate provided with a socket and further provided in said socket with an appropriate semispherical recess to receive said ball-shaped end, a pair of clamps slidably mounted on said plate and arranged when in their normal operative position to meet at the vertical axis of said recess, the opposing edges of said clamps provided with coöperating grooves arranged when said clamps are in their operative positions to form an opening the side walls of which inclose said stud and the upper portion of said ball-shaped end for locking it in said recess, and a pair of spring pressed pins arranged to engage said clamps when the latter are in their operative positions and lock said clamps against movement.

2. A coupling for the purpose described comprising a base secured to one element, a stud on said base said stud terminating in a ball-shaped lower end, a plate on the other element said plate provided with a socket and further provided in said socket with an appropriate semispherical recess to receive said ball-shaped end, a pair of clamps slidably mounted on said plate and arranged when in their normal operative position to meet at the vertical axis of said recess, the opposing edges of said clamps provided with coöperating grooves arranged when said clamps are in their operative positions to form an opening the side walls of which inclose said stud and the upper portion of said ball-shaped end for locking it in said recess, a rod extending loosely through one clamp and anchored to the other clamp, a lever pivotally secured to the first clamp and to said rod and arranged when shifted to move said clamps to their respective operative and inoperative positions.

3. A coupling for the purpose described comprising a base secured to one element, a stud on said base said stud terminating in a ball-shaped lower end, a plate on the other element said plate provided with a socket and further provided in said socket with an appropriate semispherical recess to receive said ball-shaped end, a pair of clamps slidably mounted on said plate and arranged when in their normal operative position to meet at the vertical axis of said recess, the opposing edges of said clamps provided with coöperating grooves arranged when said clamps are in their operative positions to form an opening the side walls of which inclose said stud and the upper portion of said ball-shaped end for locking it in said recess, a rod extending loosely through one clamp and anchored to the other clamp, a lever pivotally secured to the first clamp and to the rod and fulcrumed on said plate and arranged when oscillated to move said clamps to their respective operative and inoperative positions.

4. A coupling for the purpose described comprising a base secured to one element, a stud on said base said stud terminating in a ball-shaped lower end a plate on the other element said plate provided with a socket and further provided in said socket with an appropriate semispherical recess to receive said ball-shaped end, a pair of clamps slidably mounted on said plate and arranged when in their normal operative position to meet at the vertical axis of said recess, the opposing edges of said clamps provided with coöperating grooves arranged when said clamps are in their operative positions to form an opening the side walls of which inclose said stud and the upper portion of said ball-shaped end for locking it in said recess, and a pair of spring pressed pins arranged to engage said clamps when the latter are in their operative positions and lock said clamps against movement, a pair of cranks connected with said pins and arranged when oscillated to actuate them.

5. A coupling for the purpose described comprising a base secured to one element, a stud on said base said stud terminating in a ball shaped lower end a plate on the other element said plate provided with a socket and further provided in said socket with an appropriate semispherical recess to receive said ball-shaped end, a pair of clamps slidably mounted on said plate and arranged when in their normal operative position to meet at the vertical axis of said recess, the opposing edges of said clamps provided with coöperating grooves arranged when said clamps are in their operative positions to form an opening the side walls of which inclose said stud and the upper portion of said ball-shaped end for locking it in said recess, and a pair of spring pressed pins arranged to engage said clamps when the latter are in their operative positions and lock said clamps against movement, a pair of cranks connected with said pins and arranged when oscillated to actuate them, a suitably mounted operating rod on which said clamps are mounted and arranged to control the movement of said cranks for withdrawing said pins from engagement with said clamps.

In testimony whereof I have hereunto set my hand.

CHARLES E. McMANIS.